United States Patent [19]
Hwang

[11] Patent Number: 6,130,724
[45] Date of Patent: Oct. 10, 2000

[54] IMAGE PROCESSING APPARATUS AND METHOD FOR MAGNIFYING DYNAMIC RANGE

[75] Inventor: Jung-hyun Hwang, Seongnam, Rep. of Korea

[73] Assignee: Samsung Electronics Co., Ltd., Rep. of Korea

[21] Appl. No.: 09/197,706

[22] Filed: Nov. 23, 1998

[30] Foreign Application Priority Data

Nov. 24, 1997 [KR] Rep. of Korea ....................... 97-62438

[51] Int. Cl.⁷ ...................................... H04N 5/52
[52] U.S. Cl. .......................... 348/678; 348/672; 382/169; 382/172
[58] Field of Search ..................................... 348/671, 672, 348/678, 679, 687, 572; 382/168, 169, 172; H04N 5/14, 5/52, 5/57

[56] References Cited

U.S. PATENT DOCUMENTS

| | | | |
|---|---|---|---|
| 5,144,442 | 9/1992 | Ginosar, et al. | 348/222 |
| 5,294,986 | 3/1994 | Tsuji | 348/672 |
| 5,959,696 | 9/1999 | Hwang | 348/678 |

*Primary Examiner*—Sherrie Hsia
*Attorney, Agent, or Firm*—Samuels, Gauthier & Stevens LLP

[57] ABSTRACT

An apparatus and method for magnifying a dynamic range of an image while improving a contrast of an image are provided. A histogram calculator receives a digital image signal and calculates histograms depending on the illuminance distribution of an image. A histogram accumulator receives a histogram output by the histogram calculator, obtains an accumulative density function by integrating the input histogram up to each illuminance level and normalizes the accumulative density function, and generates an initial conversion function. A bias calculator determines a threshold value for dividing into a low illuminance level and a high illuminance level on the basis of a histogram output by the histogram calculator, and obtains a histogram compensation function for applying a negative bias to a histogram around the threshold value. A converter converts a digital image signal input with a predetermined delay time, according to an image conversion function obtained by applying the histogram compensation function to the initial conversion function. A digital-to-analog (D/A) converter converts a digital image signal converted by the converter into an analog image signal. Accordingly, the entire contrast of an image is improved, and simultaneously, the dynamic range thereof is magnified.

12 Claims, 7 Drawing Sheets

IMAGE PROCESSING APPARATUS AND METHOD FOR MAGNIFYING DYNAMIC RANGE

BACKGROUND OF THE INVENTION

1. Field of the Invention

The present invention relates to an image signal processing apparatus and method, and more particularly, to a dynamic range magnifying apparatus and method based on a histogram equalization technique.

2. Description of the Related Art

An image generated by a video image input device such as a camcorder includes various information on an object. However, information on illuminance and color is frequently biased or distorted in a photographed image. The bias or distortion can be attributable to the object of the photograph, the performance of the photographing apparatus, the photography conditions, etc. In many cases, to compensate for these effects, an image illuminance contrast and a dynamic range must be selectively amplified by special preprocessing.

A conventional method for improving images is a homomorphic filtering method based on a transform operation. FIG. 1 is a block diagram of a dynamic range magnifying apparatus using the homomorphic filtering method. Referring to FIG. 1, an input image signal is divided into an illuminance component and a reflectance component by a logarithmic transformer 10, and only the reflectance component is amplified by a high pass filter 12. An amplified signal is exponentially transformed by an exponential transformer 14, and the result is then output. A drawback of this method is that a large amount of calculation is required.

Alternatively, the image can be improved by a histogram equalization method based on a point operation. This histogram equalization method magnifies a dynamic range by normalizing an illuminance distribution of an image such that it is uniform. FIG. 2 is a block diagram of a typical dynamic range magnifying apparatus using the histogram equalization method. Referring to FIG. 2, an analog-to-digital (A/D) converter 20 converts an input image signal into a digital image. A histogram calculator 22 calculates the histogram of the digital image, e.g., a probability density function. A histogram accumulator 24 calculates the histogram to obtain an accumulation density function. The calculated accumulation density function is stored in a look-up table (LUT) 26 and used to convert the digital image. The digital image signal is reconverted into an analog signal by a digital-to-analog (D/A) converter 28, and the result is then output.

In such a system, when frequency is equalized as described above, this method suffers from some drawbacks. For example, quantized noise is amplified with a great change in the contrast of an illuminance band having high frequency. Also, the contrast is relatively lowered in an image portion of an illuminance signal having low frequency. In order to solve this problem, a linear histogram modification method has been proposed to improve the contrast while entirely reducing the effect of the histogram equalization by dividing a histogram into a plurality of bands and using a separate transform function for each band. However, this method requires a complicated circuit and cannot improve both the contrast and noise characteristics.

Another alternative for magnifying dynamic range can be a method of increasing the sensibility for an image by subdividing an image quantization step. In an actual camcorder, an image is usually quantized to 8 to 10 bits, thus providing an image sensibility of about 45 to 50 dB. On the other hand, it is known that human eyes have a sensibility of about 120 dB. Also, humans have nerve cells that are sensitive to bright objects and nerve cells that are sensitive to relatively dark objects. Thus, image recognition occurs in the nerve system in which sensitivity selectively differs according to a color temperature. U.S. Pat. No. 5,144,442 discloses a method for producing an image which has a wider dynamic range and is close to a human vision, by synthesizing an input image with several different exposures, in consideration of the above-described visual characteristics. A drawback of this method is that a plurality of input channels are required when applied to an actual camera, and a complicate camera system is thus provided. Also, image contrast may be deteriorated.

SUMMARY OF THE INVENTION

To overcome the above and other problems, it is an object of the present invention to provide a dynamic range magnifying apparatus and method by which the dynamic range of an image is magnified and the contrast of the image is improved. The present invention for optimizing and improving both the dynamic range and the contrast provides a useful method to correct problems associated with an image photographed against light.

The present invention provides an apparatus and method for magnifying the dynamic range. A histogram calculator receives a digital image signal and calculates histograms which depend on the illuminance distribution of an image. A histogram accumulator receives a histogram output by the histogram calculator, obtains a cumulative density function by integrating the input histogram up to each illuminance level and normalizing the cumulative density function. The histogram accumulator then generates an output and initial conversion function. A bias calculator determines a threshold value for dividing into a low illuminance level and a high illuminance level on the basis of a histogram output by the histogram calculator. The bias calculator obtains a histogram compensation function for applying a negative bias to a histogram around the threshold value. A converter converts a digital image signal input with a predetermined delay time according to an image conversion function obtained by applying the histogram compensation function to the initial conversion function. A digital-to-analog (D/A) converter converts a digital image signal converted by the converter into an analog image signal.

In one embodiment, a histogram regulator interposed between the histogram calculator and the histogram accumulator interpolates a histogram to regulate the output sensitivity of a conversion function. In one embodiment, the histogram accumulator integrates an interpolated histogram.

The apparatus can also include a log operator for integrating the histogram by predetermined logarithmic sections and outputting a histogram function. A differentiator can be used for first-order differentiating the histogram logarithmic function and outputting a first-order differentiated function. A zero crossing detector can detect a zero crossing point where a differentiated function changes from negative to positive. A threshold value determiner can determine the histogram logarithmic function and the zero crossing point, respectively, from the log operator and the zero crossing detector and determines a threshold value for dividing an image to a low illuminance and a high illuminance level. A bias determiner can receive the threshold value and determine a histogram compensation function for biasing an initial conversion function around the threshold value. In one embodiment, the converter comprises a look-up table for storing output image signal levels with respect to each image signal level.

In one embodiment, the invention includes an analog-to-digital (A/D) converter which converts an analog image signal into the digital image signal. A memory unit can store the digital image signal during at least one frame cycle. The histogram calculator can receive the digital image signal from the A/D converter, and the converter can convert an image signal output by the memory unit and devade with a predetermined time.

The invention can include a first frame memory for receiving the digital image signal from the A/D converter, storing the received image signal in units of one frame, and outputting a one frame-delayed signal. A second frame memory can receive the one frame-delayed signal from the first frame memory, stored the received signal in units of one frame, and output a two frame-delayed signal. The histogram can receive the one-frame delayed signal from the first frame memory, and the converter can receive the two frame-delayed signal from the second frame memory.

In the dynamic range magnifying method according to the present invention, first, a digital image signal is received, and histograms depending on the illuminance distributions of an image are calculated. An initial conversion function is generated by obtaining an accumulative density function by integrating the histogram for each illuminance level and normalizing the accumulative density function. A threshold value for dividing into a low illuminance level and a high illuminance level is determined on the basis of the histogram, and a histogram compensation function for applying a negative bias to the histogram at levels around the threshold value is obtained. A digital image signal input with a predetermined delay time is converted according to an image conversion function obtained by applying the histogram compensation function to the initial conversion function. The digital image signal is converted into an analog image signal.

In the case of an input image photographed against light, a low illuminance portion is excessively suppressed, and a high illuminance portion is easily saturated, so that it is difficult to determine an appropriate exposure. Accordingly, in the present invention, the low illuminance image portion and the high illuminance image portion are separately converted by appropriate conversion functions. That is, in the present invention, an image photographed against the light is divided by a threshold value of a predetermined level, and a substantially separate conversion function is applied to each section, thereby improving the contrast of an image and appropriately controlling the dynamic range with respect to the image.

In the prior art, an image can be divided into two portions by a discrimination analysis method with respect to a histogram. However, in a real image, this histogram distribution is dense in a low illuminance portion, and the histogram is sparse in a high illuminance portion, so that it is very difficult to determine a threshold value using a conventional method. Thus, in the present invention, a method based on a histogram logarithmic function is used to determine the threshold value.

To be more specific, according to an experiment, when an image is photographed against the light, a low illuminance portion has a very higher band compression rate than a high illuminance portion. Accordingly, when a value obtained by integrating the histogram of an image into several sections having log is taken, a new histogram (hereinafter, called "histogram logarithmic function) can be obtained. The histogram logarithmic function has a distribution form conformable to the visual characteristics of a human being, since the human being's visual characteristics include the recognition property of a logarithmic function. An appropriate threshold value for image division is determined from a minimum position of a histogram logarithmic distribution. For this, the histogram logarithmic function distribution is differentiated, and a point at which the differentiated values zero-cross with each other is adopted. Generally, a histogram logarithmic function forms two humps at the low and high illuminance areas for an image photographed against the light, and thus a position where differentiated values of the logarithmic function are zero is detected to find the valley between the two humps. As a result, a point having the lowest histogram logarithmic function value in the vicinity of the above position is determined as an optimal threshold value for image division.

In the present invention, an image signal is converted using a conversion function made by integrating the histogram of an image, and a conversion function with respect to a low illuminance image and that with respect to a high illuminance image become substantially different from each other by applying a negative bias to the vicinity of the threshold value on an accumulated density function obtained by integrating the histogram. As described above, contrast deterioration as a defect of the histogram equalization technique can be significantly overcome by applying substantially-separated conversion functions respectively to a low illuminance image and a high illuminance image.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 1:
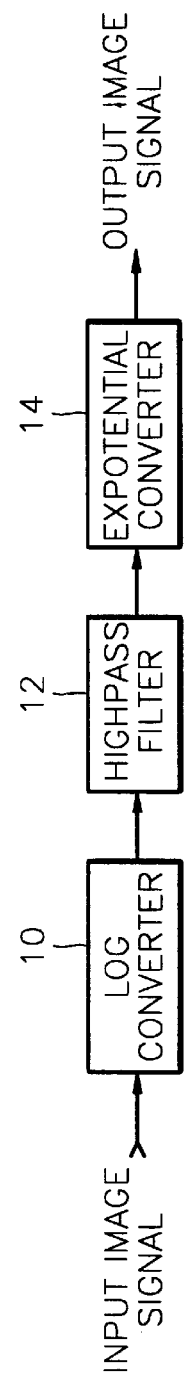
FIG. 1 is a block diagram of a conventional dynamic range magnifying apparatus using a homomorphic filtering method.
Figure 2:
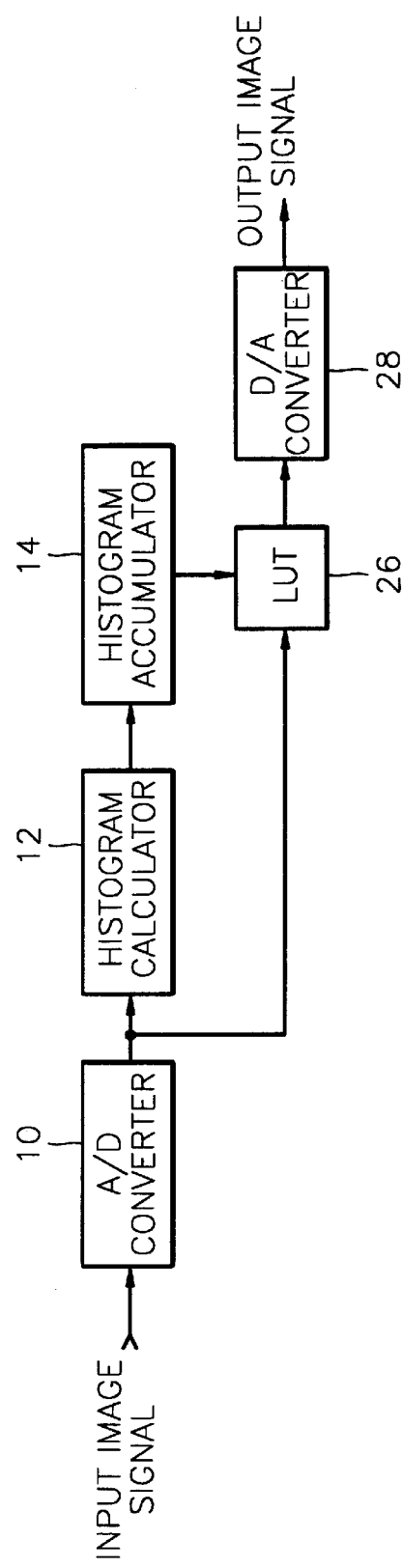
FIG. 2 is a block diagram of a conventional dynamic range magnifying apparatus using a histogram equalization method.
Figure 3:
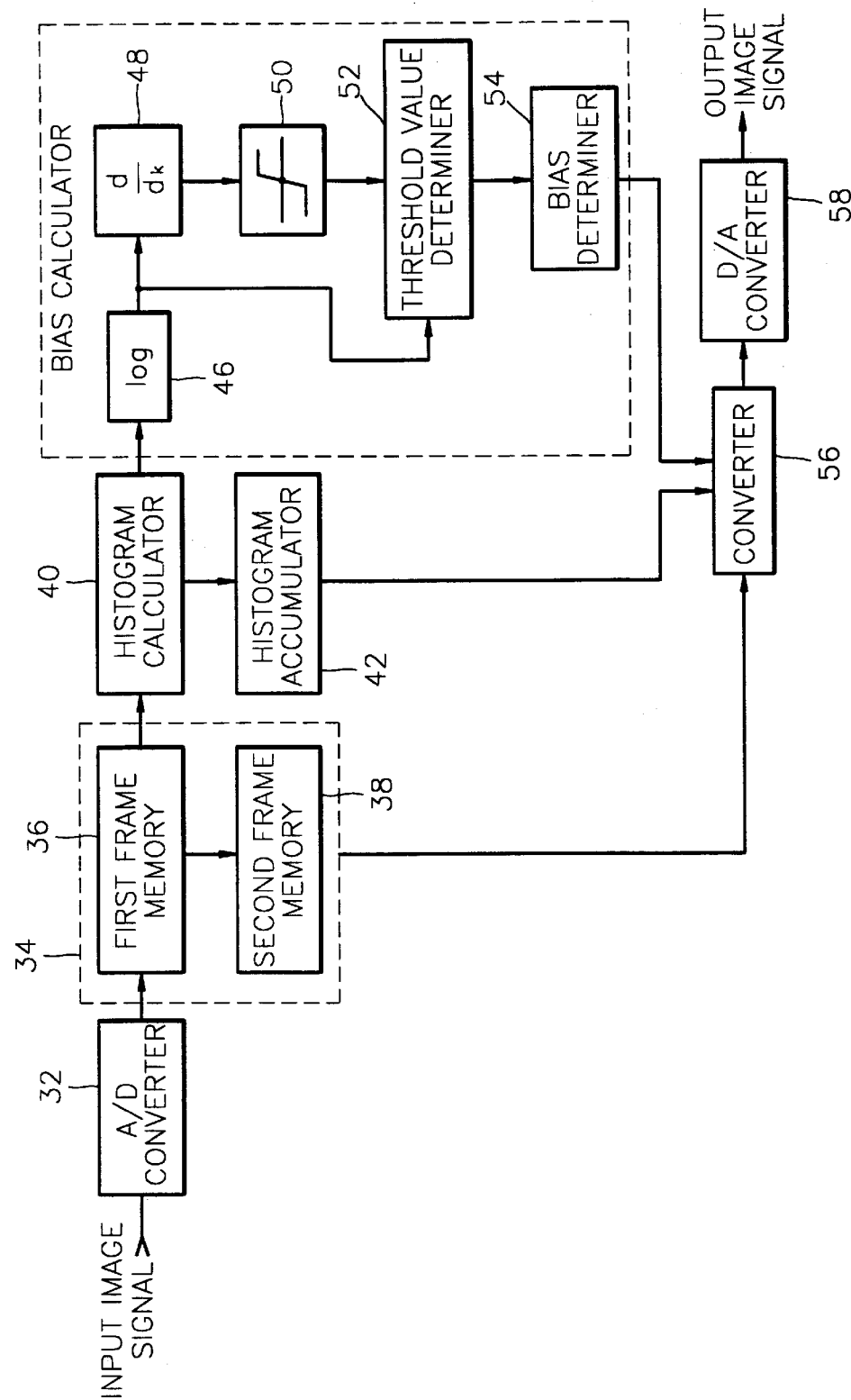
FIG. 3 is a block diagram of one embodiment of a dynamic range magnifying apparatus according to the present invention.
Figure 6:
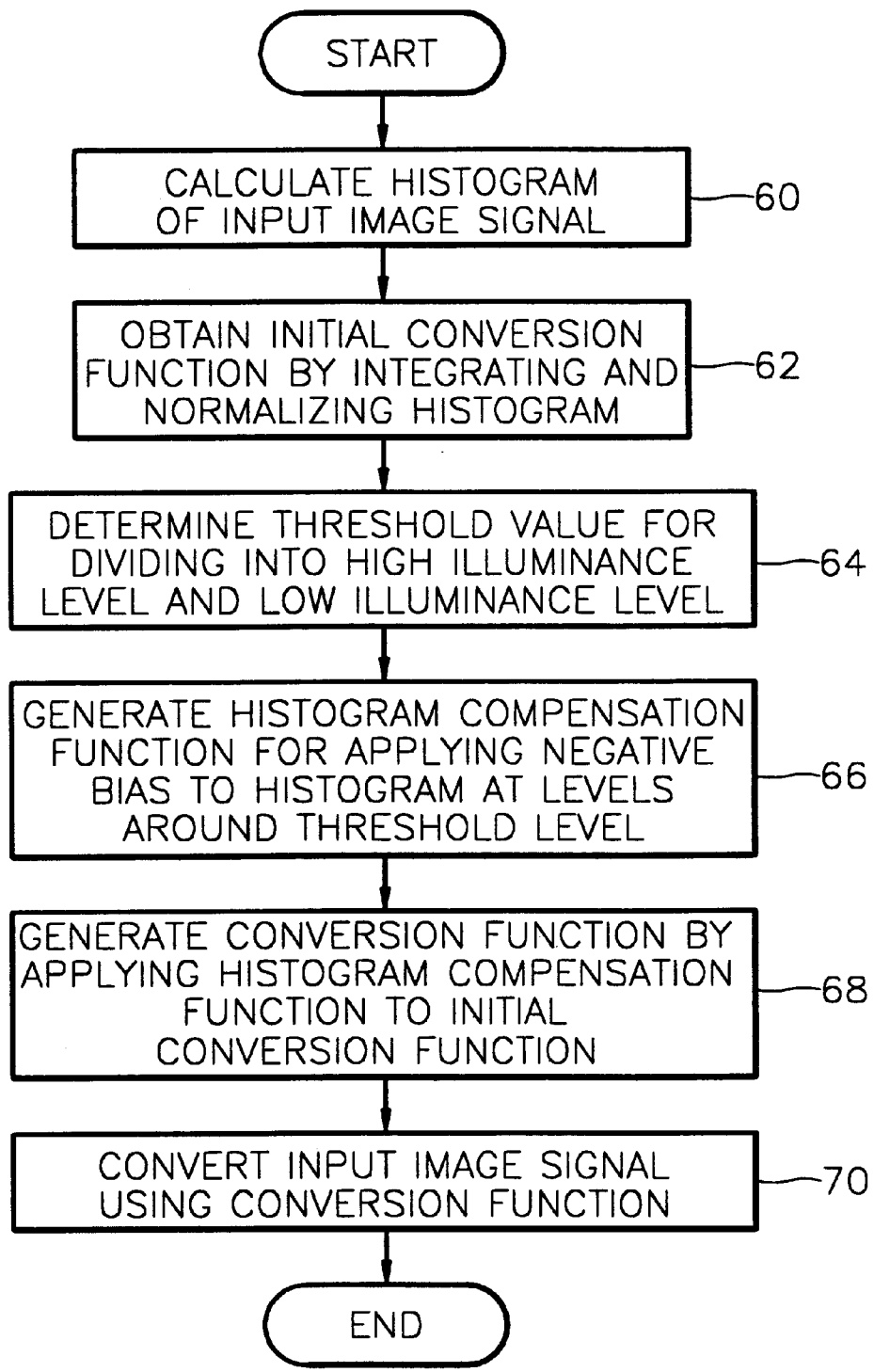
FIG. 6 is a flowchart for illustrating one embodiment of a dynamic range magnifying method according to the present invention.

FIG. 3 is a schematic block diagram illustrating one embodiment of a dynamic range magnifying system in accordance with the invention, and FIG. 6 is a schematic flow chart illustrating the logical flow of one embodiment of a dynamic range magnifying process according to the invention. Referring to FIGS. 3 and 6, an analog-to-digital (A/D) converter 32 receives an analog image signal and converts the analog image signal into a digital image signal. In the present embodiment, the input image signal is provided from a CCD photographing unit of a camcorder. However, the present invention is not limited to this embodiment, and can also be employed in other application fields such as processing of images stored in a recording medium.

In a frame memory 34, a first frame memory 36 receives a digital image signal from the A/D converter 32, stores the digital image signal in units of a frame, and outputs a signal delayed by one frame. A second frame memory 38 receives the one-frame-delayed signal from the first frame memory 36, stores it in units of a frame, and outputs a signal delayed again by one frame, i.e., a signal delayed by two frames compared to the input image signal.

A histogram calculation unit 40 receives the one-frame-delayed signal from the first frame memory 36 and calculates histograms depending on the illuminance distribution of an image, in step 60 of FIG. 6. If a histogram with respect to the entire screen of one frame is taken on the assumption that an object is photographed against the light, the distribution of a histogram is dense in low illuminance and sparse in high illuminance, thus generating the illuminance plot forming the shape of FIG. 4A.

In one embodiment, the system of the invention includes an optional histogram regulator 41 (shown in phantom) between the histogram calculator 40 and histogram accumulator 42. The histogram regulator 41 generates an interpolated histogram from the histogram calculated by the histogram calculator 40. This is done to regulate the output sensitivity of a conversion function of the invention. The interpolated histogram is then forwarded to the histogram accumulator 42.

A histogram accumulation unit 42 receives the histogram output by the histogram calculation unit 40 (or by the optional histogram regulator 41) and obtains an accumulative density function by integrating the input histogram to different illuminance levels. An initial conversion function is output by performing normalization enabling the maximum value of an output image level to be equal to that of an input image level, in step 62. When the illuminance level of an image is represented by i ($0 \leq i < R$, wherein i is an integer and R is the maximum value of a converted illuminance level), histogram is represented by h(i), and an illuminance variable is represented by x, the initial conversion function is expressed by the following Equation 1:

$$f(x) = m_0 \sum_{i=0}^{x} h(i) \qquad (1)$$

wherein $m_0$ is a normalization constant.

Meanwhile, in other embodiments of the present invention, a histogram regulation unit for interpolating histogram to regulate the output sensitivity of a conversion function can be interposed between the histogram calculation unit 40 and the histogram accumulation unit 42. An example of the interpolated histogram output by the histogram regulation unit can be expressed by the following Equation 2:

$$h_w(i) = h(i) \times w + k_0 \times (1.0 - w) \qquad (2)$$

wherein w can be determined by a user to be between 0 and 1, and $k_0$ is determined as $1/(m_0 \cdot R)$ when the (w) value was determined. When the histogram has been interpolated as in Equation 2, an initial conversion function output by the histogram accumulation unit 42 is expressed by the following Equation 3:

$$f_w(i) = m_0 \sum_{i=0}^{x} h_w(i) \qquad (3)$$

Figure 4A:
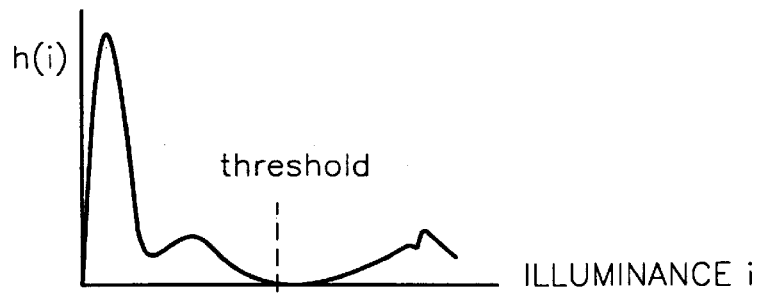
FIG. 4A is graph showing the changing histogram of an image photographed against the light.
Figure 4B:
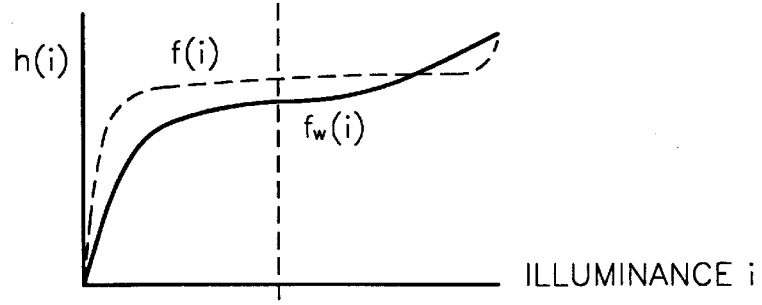
FIG. 4B is a graph showing a comparison of an initial conversion function when a histogram has been interpolated to that when the histogram is not interpolated.

FIG. 4B shows the initial conversion function when the histogram of an image having a distribution shape of FIG. 4A is not interpolated, and that when it has been interpolated with a (w) value of 0.5. It can be seen that a contrast in a low illuminance area where the illuminance distribution is dense decreases, and a contrast in a high illuminance area increases.

A bias calculation unit 44 generates a threshold value for distinguishing a low illuminance level from a high illuminance level on the basis of the histogram output by the histogram calculation unit 40, and obtains a histogram compensation function for applying a negative bias to the histogram at levels around the threshold value, in steps 64 and 66. This will be described in more detail below.

Figure 5A:
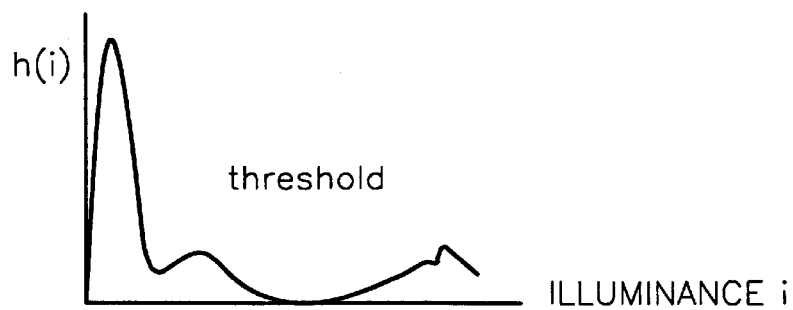
FIG. 5A is a graph showing a histogram of an image photographed against the light.
Figure 5B:
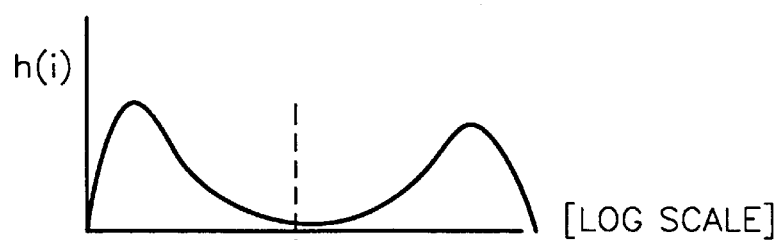
FIG. 5B is a graph showing a histogram logarithmic function corresponding to a log scale representation of FIG. 5A.

A log operator 46 integrates the histogram by predetermined logarithmic sections and outputs a histogram logarithmic function. For example, when a variable representing illuminance is indicated by (i), and a histogram is indicated by h(i), a histogram logarithmic function $h_{LOG}$ for changing an illuminance variable (k) logarithmically in units of one level is defined by the following Equation 4:

$$h_{LOG}(k) = \sum_{i=2^k}^{2^{k-1}-1} h(i) \qquad (4)$$

wherein k is an integer and can be between 1 and 10 when an image signal is converted into a digital signal by a 10-bit A/D converter. However, it is substantially preferable that an image signal when k is smaller than or equal to 4, i.e., when the illuminance level is 16 or smaller, is ignored since its information capability is too deteriorated. The histogram logarithmic function $h_{LOG}$ expressed by Equation 4 is shown in FIG. 5B. FIG. 5A is a plot like FIG. 4A of the histogram h(i) of an image photographed against the light.

A differentiator 48 primarily differentiates the histogram logarithmic function, and outputs a first differentiating function $h'_{LOG}$ of the histogram logarithmic function which is expressed by the following Equation 5:

$$h'_{LOG}(k) = \frac{d}{dk} h_{LOG}(k) \qquad (5)$$

A zero-crossing detector 50 detects a portion where the differentiating function is changed from negative to positive, using the conditions expressed by the following Equation 6:

$$k_s = \{k | h'_{LOG}(k-1) \leq 0, h'_{LOG}(k) > 0, h_{LOG}(k) \leq h_{MAX}\} \qquad (6)$$

Figure 5C:
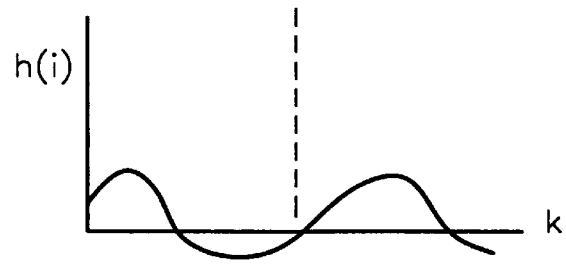
FIG. 5C is a graphic showing positions detected by zero crossing.

The portion detected by zero crossing is shown in FIG. 5C.

Even if zero crossing was detected under the first two conditions using the first differentiating function of the histogram logarithmic function, if many illuminance distributions exist around the zero crossing, this cannot be considered as a back light state, and the zero crossing cannot be used as a threshold value for dividing an image. As represented by the third condition of Equation 6, only when a histogram logarithmic function $h_{LOG}(k)$ in zero crossing is smaller than or equal to a predetermined critical value $h_{LOG\_MIN}$, the threshold value is detected using the first differentiating function of the histogram logarithmic function.

A threshold value determiner 52 receives the histogram logarithmic function and zero crossing point respectively from the log operator and the zero crossing detector, fixes an illuminance level being the minimum value of the histogram logarithmic function, and determines this value as a threshold value for dividing an image into low and high illuminance levels.

Figure 4C:
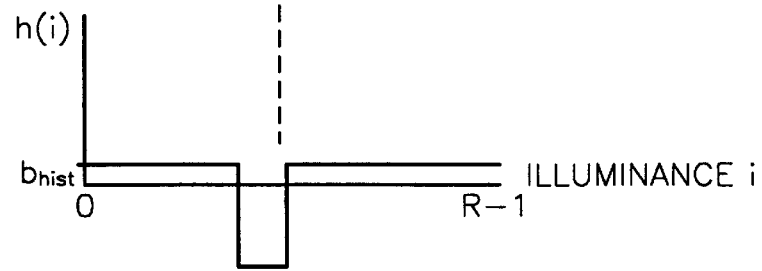
FIG. 4C shows an example of a histogram compensating function.

A bias determiner 54 receives the threshold value and determines a histogram compensation function for biasing an initial conversion function in the vicinity of the threshold value according to the following Equation 7:

$$b(i) = \begin{matrix} b_p - \dfrac{R \cdot b_p}{2^{k_s} - 2^{k_s-1}} & \text{(case of } 2^{k_s-1} \leq x < 2^{k_s}) \\ b_p & \text{(other cases)} \end{matrix} \qquad (7)$$

wherein $b_p$ is a constant which is fixed to increase contrast, R is a maximum value of a histogram dynamic range, and ($2^{k_s-1} \leq x < 2^{k_s}$) represents an area where the histogram compensation function has a negative value. This histogram compensation function is shown in FIG. 4C.

A converter 56 obtains an image conversion function as the following Equation 8, by applying the histogram compensation function to the initial conversion function, in step 68:

$$f_{WDR}(l) = M_0 \sum_{i=0}^{x} (h_w(i) + b(i)) \qquad (8)$$

Figure 4D:
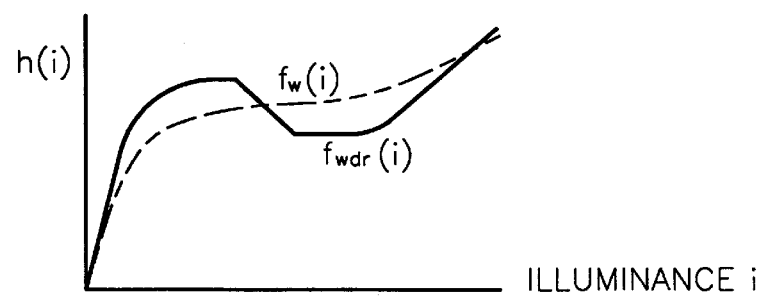
FIG. 4D is a graph showing a comparison of an initial conversion function before the histogram is not interpolated using the histogram compensating function, to an image conversion function.

FIG. 4D shows the comparison of an image conversion function to an initial conversion function before a histogram is not compensated for using the histogram compensation function.

A converter 56 receives a two-frame-delayed image signal output by the second frame memory 38, and converts this signal according to the image conversion function, in step 70. In a preferred embodiment of the present invention, the converter 56 includes a look-up table (LUT) for storing input image signal level values with respect to each input image signal level, and outputs an image signal level value corresponding to an input image signal input from the second frame memory 38.

A D/A converter 58 converts a digital image signal converted by the converter 56 into an analog image signal, and outputs a digital image signal whose dynamic range is magnified compared to the input digital image signal.

The above-described preferred embodiment of the present invention can be modified into various other forms. For example, in another embodiment of the present invention, the frame memory 34 can be comprised of more than 3 frame memories in consideration of the delay time of a signal, instead of comprising two frame memories. Also, in still another embodiment of the present invention, the frame memory 34 can be a single memory. In this embodiment, a histogram calculator receives a digital image signal directly from the A/D converter, and the converter receives an image signal delayed a predetermined time from the memory and converts it.

Figure 7:
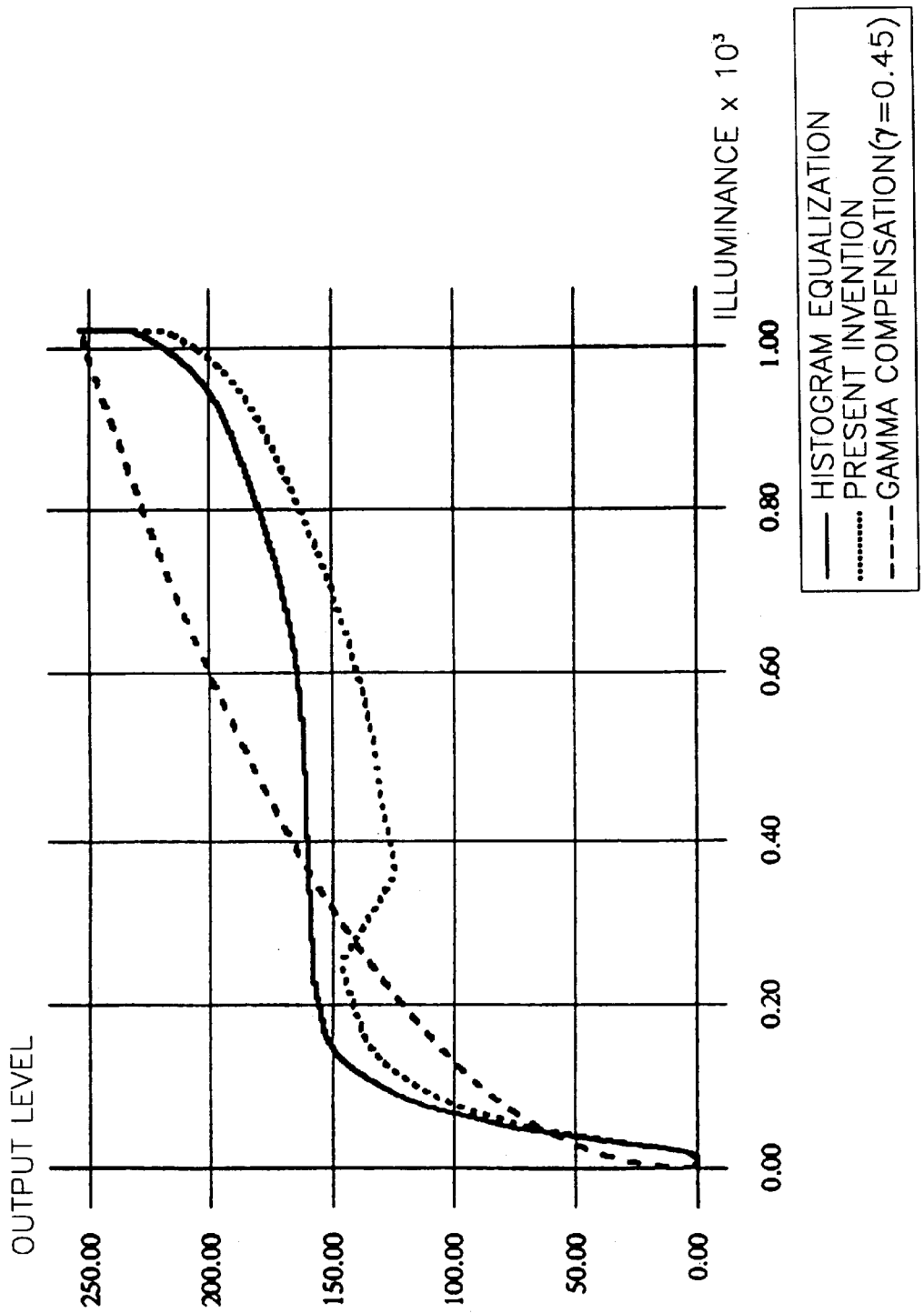
FIG. 7 is a graph showing a comparison of conversion functions used in a conventional histogram equalization and gamma compensation and the conversion function for the present invention.

FIG. 7 is a graph showing the comparison of conversion functions used in the conventional histogram equalization and gamma compensation to the conversion function for the present invention. It can be seen that in the conversion function in the present invention, the dynamic range and contrast in the high illuminance area are improved, compared to the conventional histogram equalization. Also, the present invention has a significantly more improved contrast in the low and high illuminance areas than the conventional gamma compensation technique.

As described above, the present invention is described in the form of one Equation, but actually applies separate conversion functions to each of dark and bright images to improve the entire contrast of an image and simultaneously broaden the dynamic range, resulting in optimized contrast and dynamic range.

FIGS. 8A through 8D are pictures representing the results when the conventional histogram equalization and gamma compensation and the present invention are applied to a test image, to show the advantages of the present invention.

Figure 8A:
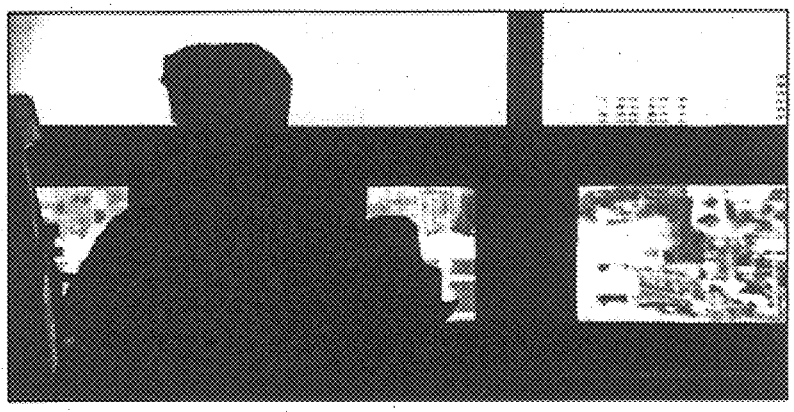
FIGS. 8A through 8D showing the results when the conventional histogram equalization and gamma compensation and the present invention are applied to a test image.

FIG. 8A shows an example of an original input image with 940×480 pixels and a resolution of 10 bits. It can be seen that this image is seriously saturated in the high and low illuminance areas since it was photographed against light.

Figure 8B:
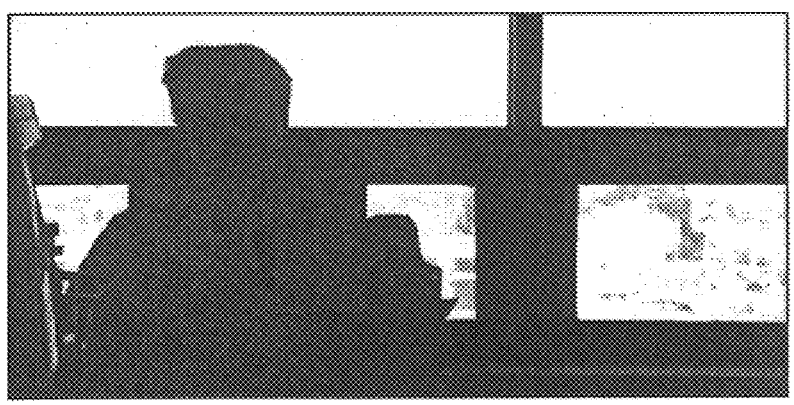

FIG. 8B shows the result of gamma-compensating for the image of FIG. 8A with a gamma value of 0.45. From the comparison of FIG. 8A to FIG. 8B, it can be seen that illuminance at low illuminance is increased, but the entire contrast of the image is reduced.

Figure 8C:
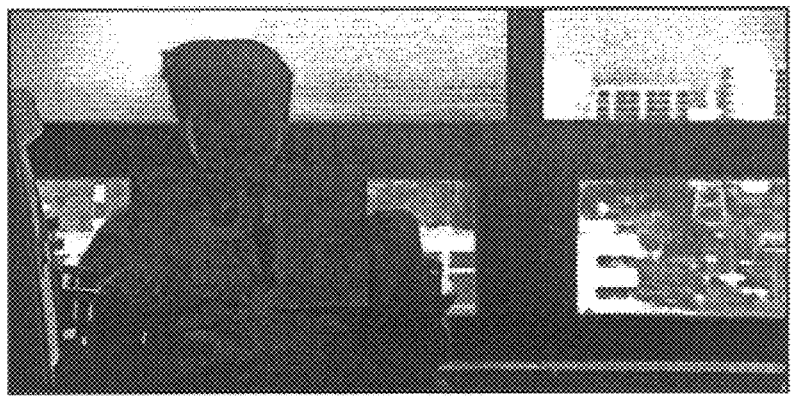

FIG. 8C shows the result of histogram-equalizing the image of FIG. 8A. From the comparison of FIG. 8A to FIG. 8C, it can be seen that the contrast of the image was increased, but the image distribution in high illuminance areas was reduced. This reduction arises because the conversion function changes gently in the middle illuminance area but changes precipitously in the high illuminance area as shown in FIG. 7.

Figure 8D:
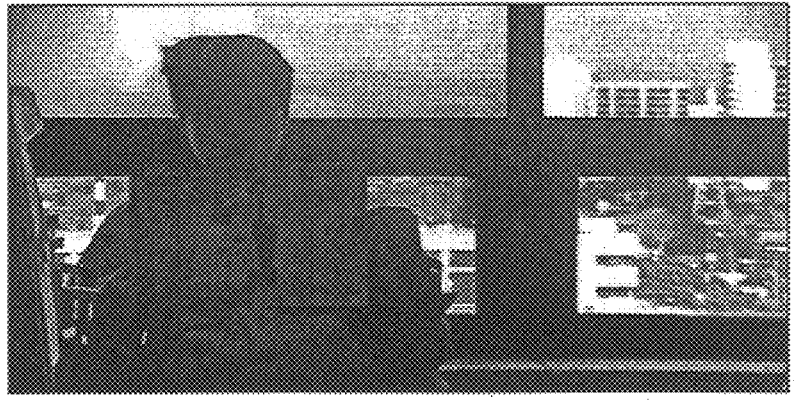

FIG. 8D shows the result of using the method of the present invention. It can be seen that the image contrast and visual dynamic range have been improved.

In the present invention discontinuity may occur at a threshold value portion, i.e., a boundary between the low and high illuminance areas of the conversion function. However, image distribution around the threshold value is very low under a back light state, and thus this discontinuity effect does not seriously degrade a displayed image.

An additional effect allowing profile compensation on an output image is provided if only the boundary becomes smooth as the boundary portion of the conversion function has been low-pass filtered.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A dynamic range magnifying apparatus comprising:
   a histogram calculator for receiving a digital image signal and calculating histograms depending on an illuminance distribution of an image;
   a histogram accumulator for receiving a histogram output by the histogram calculator, obtaining a cumulative density function by integrating the input histogram up to each illuminance level and normalizing the cumulative density function, and generating and outputting an initial conversion function;
   a bias calculator for determining a threshold value for dividing into a low illuminance level and a high illuminance level on the basis of the histogram output by the histogram calculator, and obtaining a histogram compensation function for applying a negative bias to a histogram around the threshold value; and
   a converter for converting the digital image signal input with a predetermined delay time, according to an image conversion function obtained by applying the histogram compensation function to the initial conversion function.

2. The dynamic range magnifying apparatus as claimed in claim 1, further comprising a histogram regulator between the histogram calculator and the histogram accumulator for interpolating the histogram to regulate the output sensitivity of a conversion function.

3. The dynamic range magnifying apparatus as claimed in claim 2, wherein the histogram regulator interpolates the histogram according to the following Equation:

$$h_w(i) = h(i) \times w + k_0 \times (1.0 - w)$$

wherein h(i) is a histogram, $h_w(i)$ is an interpolated histogram, w is a value which can be determined by a user between 0 and 1, and $k_0$ is determined to be $1/(m_0 \cdot R)$, where $m_0$ is a normalization constant and R is a maximum value of a converted illuminance level obtained by the initial conversion function.

4. The dynamic range magnifying apparatus as claimed in claim 1, wherein the bias calculator comprises:
   a log operator for integrating the histogram by predetermined logarithmic sections and outputting a histogram logarithmic function;
   a differentiator for 1st-order differentiating the histogram logarithmic function and outputting a 1st-order differentiated function;
   a zero crossing detector for detecting a zero crossing point where the differentiated function changes from negative to positive;
   a threshold value determiner for determining the histogram logarithmic function and the zero crossing point, respectively, from the log operator and the zero crossing detector and determining the threshold value for dividing an image into the low illuminance level and the high illuminance level; and
   a bias determiner for receiving the threshold value and determining the histogram compensation function for biasing the initial conversion function around the threshold value.

5. The dynamic range magnifying apparatus as claimed in claim 4, wherein the zero crossing detector determines a k value satisfying the following conditions, as a zero crossing point:

$$h'_{LOG}(k-1) \leq 0, \; h'_{LOG}(k) > 0$$

wherein k is an illuminance variable which is an integer between 0 and 1 when an image signal is converted into the digital image signal, $h'_{LOG}(k)$ is a histogram logarithmic function for changing the illuminance variable k logarithmically in units of one level, and $h'_{LOG}(k-1)$ is a first differentiation function of the histogram logarithmic function.

6. The dynamic range magnifying apparatus as claimed in claim 1, wherein the converter comprises a look-up table for storing output image signal levels with respect to each input image signal level.

7. The dynamic range magnifying apparatus as claimed in claim 1, further comprising:
   an analog-to-digital (A/D) converter for converting an analog image signal into the digital image signal; and
   a memory unit for storing the digital image signal during at least one frame cycle.

8. The dynamic range magnifying apparatus as claimed in claim 7, wherein the histogram calculator receives the digital image signal from the A/D converter, and the converter converts an image signal output by the memory unit and delayed with a predetermined time.

9. The dynamic range magnifying apparatus as claimed in claim 7, wherein the memory unit comprises:
   a first frame memory for receiving the digital image signal from the A/D converter, storing the received image signal in units of one frame, and outputting a one frame-delayed signal; and
   a second frame memory for receiving the one frame-delayed signal from the first frame memory, storing the received signal in units of one frame, and outputting a two frame-delayed signal,
   wherein the histogram calculator receives the one frame-delayed signal from the first frame memory, and the converter receives the two frame-delayed signal from the second frame memory.

10. A method of magnifying a dynamic range, comprising the steps of:
   (a) receiving a digital image signal and calculating histograms depending on an illuminance distributions of an image;
   (b) obtaining an initial conversion function by obtaining a cumulative density function by integrating the histogram for each illuminance level and normalizing the cumulative density function;
   (c) determining a threshold value for dividing into a low illuminance level and a high illuminance level on the basis of the histogram, and obtaining a histogram compensation function for applying a negative bias to the histogram at levels around the threshold value;
   (d) converting the digital image signal input with a predetermined delay time, according to an image conversion function obtained by applying the histogram compensation function to the initial conversion function; and
   (e) converting the digital image signal into an analog image signal.

11. The method of magnifying a dynamic range as claimed in claim 10, wherein the step (c) comprises the substeps of:

obtaining a histogram logarithmic function by integrating the histogram by predetermined logarithmic sections;

obtaining a 1st-order differentiated function by 1st-order differentiating the histogram logarithmic function;

detecting a zero crossing point where the 1st-order differentiated function changes from negative to positive;

determining the threshold value for dividing into the low illuminance level and the high illuminance level on the basis of the histogram logarithmic function and the zero crossing point; and determining the histogram compensation function for biasing the initial conversion function around the threshold value.

12. The dynamic range magnifying apparatus as claimed in claim 1, further comprising a digital-to-analog (D/A) converter for converting the digital image signal converted by the converter into an analog image signal.

* * * * *